United States Patent [19]
Furuta et al.

[11] Patent Number: 5,891,532
[45] Date of Patent: Apr. 6, 1999

[54] LIQUID CRYSTAL POLYESTER RESIN COMPOSITION FILM

[75] Inventors: Motonobu Furuta, Chiba; Takanari Yamaguchi, Tsukuba, both of Japan

[73] Assignee: Sumitomo Chemical Company, Limited, Osaka, Japan

[21] Appl. No.: 630,986

[22] Filed: Apr. 12, 1996

[30] Foreign Application Priority Data

| Apr. 12, 1995 | [JP] | Japan | 7-087142 |
| Apr. 12, 1995 | [JP] | Japan | 7-087147 |
| Apr. 18, 1995 | [JP] | Japan | 7-092866 |
| Apr. 26, 1995 | [JP] | Japan | 7-102497 |
| Mar. 27, 1996 | [JP] | Japan | 8-072736 |

[51] Int. Cl.$^6$ .................................................. C09K 19/00
[52] U.S. Cl. ........................ 428/1; 252/299.01; 428/412; 428/474.4; 428/475.2; 428/480
[58] Field of Search ................................. 428/1, 480, 412, 428/474.4, 475.2; 252/299.01

[56] References Cited

U.S. PATENT DOCUMENTS

| 4,975,312 | 12/1990 | Lusignea et al. | 428/209 |
| 5,216,073 | 6/1993 | Haider et al. | 525/66 |
| 5,395,470 | 3/1995 | Toh | 156/244.11 |
| 5,498,689 | 3/1996 | Furuta | 528/214 |
| 5,563,216 | 10/1996 | Niwano | 525/65 |

FOREIGN PATENT DOCUMENTS

| 0503065 | 9/1992 | European Pat. Off. . |
| 0672721 | 9/1995 | European Pat. Off. . |
| 0734851 | 10/1996 | European Pat. Off. . |
| 52-109578 | 9/1977 | Japan . |
| 56-46728 | 4/1981 | Japan . |
| 58-31718 | 2/1983 | Japan . |
| 62-187033 | 8/1987 | Japan . |
| 63-95930 | 4/1988 | Japan . |
| 63-173620 | 7/1988 | Japan . |
| 63-242513 | 10/1988 | Japan . |
| 64-69323 | 3/1989 | Japan . |
| 2-178016 | 7/1990 | Japan . |
| 2-253919 | 10/1990 | Japan . |
| 2-253920 | 10/1990 | Japan . |
| 2-253949 | 10/1990 | Japan . |
| 2-253950 | 10/1990 | Japan . |
| 3-288623 | 12/1991 | Japan . |
| 4-004126 | 1/1992 | Japan . |
| 4-049026 | 2/1992 | Japan . |
| 4-050233 | 2/1992 | Japan . |
| 9 015706 | 12/1990 | WIPO . |

Primary Examiner—Nasser Ahmad
Attorney, Agent, or Firm—Birch, Stewart, Kolasch & Birch, LLP

[57] ABSTRACT

A liquid crystal polyester resin composition film made of a liquid crystal polyester resin composition comprising (A) 56 through 99% by weight of a liquid crystal polyester and (B) 44 through 1% by weight of a thermoplastic resin having an epoxy group and molded with uniaxial orientation, with biaxial orientation, by blown film extrusion or by laminating. The above liquid crystal polyester resin composition has an improved behavior in molten state which has been extraordinary in and drawback of the conventional liquid crystal polyesters and is easily molded into a film with excellent mechanical strength heat resistance and gas-barrier properties.

7 Claims, No Drawings

LIQUID CRYSTAL POLYESTER RESIN COMPOSITION FILM

BACKGROUND OF THE INVENTION

FIELD OF THE INVENTION

The present invention relates to a film which is made of a liquid crystal polyester resin composition and which is excellent in mechanical strength, heat resistance and gas-barrier properties and a process for producing the same.

BACKGROUND INFORMATION

While gas-barrier films are widely used in the industrial world, the existing gas-barrier films do not well satisfy demands of the market under the present situation. More particularly, despite various demands of the market that gas barrier films must have properties such as heat resistance which enables a use of the film in an electronic range (microwave oven) or enables a heat treatment as a wrapping for retort-packed foods, molding processibility which enables easy molding to a film and easiness of recycling or discard after use, in addition to the gas-barrier properties, the existing gas-barrier films do not fully meet these demands.

For example, polypropylene films are insufficient in gas-barrier properties and ethylene-vinyl acetate copolymer films remarkably lose gas-barrier capacity under hygroscopic conditions and are insufficient in heat resistance. Polyvinylidene chloride films are inferior in heat resistance and cause environment problem on discard due to chlorine atom as an constituent of them.

Polyethylene terephthalate films (hereinafter, polyethylene terephthalate may be abbreviated as PET) are also insufficient in heat resistance and low in water vapor-barrier properties.

Gas-barrier films produced by depositing an inorganic material such as silica or alumina onto an ethylene-vinyl acetate copolymer or PET are insufficient in heat resistance, have problems such as peeling of film and further have a defect that films having a deposited metal can not be used in an electronic range.

On the other hand, liquid crystal polyesters, generally called thermotropic liquid crystal polymers, are polyesters characterized by the fact that the molecules are oriented by the strong intermolecular interaction in the molten state. Because of their strong intermolecular interaction and intermolecular orientation, the liquid crystal polyesters have been expected to be commercialized as a film material having functions including gas-barrier properties, in addition to other properties such as high strength, high modulus of elasticity and high heat resistance which are well known for these polyesters.

Since, however, the liquid crystal polyesters, different from aromatic polyesters such as polyethylene terephthalate and polybutylene terephthalate, have the characteristic that their molecular chains are remarkably oriented in the flow direction without causing entanglement even in the molten state because of rigidity of their molecules, they show behaviors that the melt viscosity drops suddenly down by a slight shearing and that the melt viscosity decreases rapidly by a rise in the temperature and the melt tension in the molten state is extraordinarily low. Therefore, they have a great problem that their practical use in the fields of film molding and blow molding because it is very difficult to hold its shape in the molten state and to hold a balance of properties in the machine and traverse directions due to their molecular orientation which may cause, in an extreme case, to be broken in the direction of molecular orientation. Accordingly, properties of the liquid crystal polyesters have not been sufficiently employed in practical use.

As regards the liquid crystal polyesters, JP-A-52-109578 and JP-A-58-31718 disclosed laminates of uniaxially oriented liquid crystal polyester films bonded together in the direction in which the anisotropies of strength are canceled. These, however, have problems that productivity is inferior and the films are easily peeled.

U.S. Pat. No. 4975312, WO 9015706 and others disclosed inventions in which the anisotropy of the liquid crystal polyesters was canceled by rotating ring dies, JP-A-63-173620 disclosed an invention in which the anisotropy was canceled by a blown film extrusion method using a special slit, and JP-A-62-25513, JP-A-63-95930 and JP-A-63-242513 disclosed special inventions in the T-die method. These, however, have defects that they use very special molding method in order to relieve the anisotropy due to the molecular orientation, are costly, have a limit in decreasing the film thickness and thus have no practical utility.

JP-A-62-187033, JP-A-64-69323, JP-A-2-178016, JP-A-2-253919, JP-A-2-253920, JP-A-2-253949 and JP-A-2-253950 proposed multilayer (laminated) sheets and multi-layer films of a liquid crystal polyester and a thermoplastic resin. These, however, have problems that they are easily peeled due to an adhesive layer intervening between the layers, that properties such as gas-barrier capacities and heat resistance which are originally present in the liquid crystal polyesters are deteriorated and that production of a thin film is difficult.

JP-A-61-192762 and JP-A-1-288421 disclosed molded products made of compositions produced by kneading a polyester such as PET and a liquid crystal polyester but these are insufficient in gas-barrier properties.

JP-A-4-81426 disclosed a method in which a film was molded from a reaction product of a liquid crystal polyester and a biscarbodiimide compound by the blown film extrusion method. This film has a demerit that the method of production is limited to the blown film extrusion method and has a problem on discarding because an imide compound, a nitrogen compound, is used.

JP-A-5-186614 disclosed a cast film of a liquid crystal polymer excellent in gas-barrier properties. This film, however, has problems that it is inferior in processibility and that it is costly.

On the other hand, the blown film extrusion method has been attempted in order to relieve the anisotropy of the liquid crystal polyesters and obtain liquid crystal polyester films of high strength.

The blown film extrusion method refers to a method in which a resin melt-kneaded within an extruder is extruded from a die having a circular slit to form a tubular molten product, which in turn is expanded by introducing a certain amount of the air within its inside space while cooling the circular periphery of the tube to produce a tubular film.

For example, JP-A-63-173620, JP-A-3-288623, JP-A-4-4126, JP-A-4-50233 and JP-A-4-49026 disclosed methods of blowing films of liquid crystal polyesters. These, however, are not generally applicable film-molding methods because they are the tubular film process using a special molding apparatus, they are directed to the liquid crystals of limited structure or they are the blown film extrusion under very limited conditions.

In short, while various attempts have been made on the processing of liquid crystal polyesters as described above, none of them have successfully solved the basic problems of the liquid crystal polyesters including the anisotropy of the liquid crystal polyesters and difficulty in film-molding due to the rapid change of melt viscosity. Therefore, there has been a strong demand of the market for a liquid crystal polyester resin composition which retains excellent properties of the liquid crystal polyester such as gas-barrier properties, which is improved in mechanical properties and anisotropy and which can be easily molded into a film.

The present invention is aimed to provide a film which is made of a liquid crystal polyester resin composition, retaining excellent properties of the liquid crystal polyesters such as mechanical strength, heat resistance and gas-barrier properties and having improved behavior in molten state which has been extraordinary in and drawback of the conventional liquid crystal polyesters and a process for producing such a film.

The present invention has been accomplished as the result of extensive studies, conducted by the present inventors, for solving the above problems.

SUMMARY OF THE INVENTION

Accordingly, the present invention provides:

[1] A liquid crystal polyester resin composition film made of a liquid crystal polyester resin composition comprising (A) a liquid crystal polyester and (B) a thermoplastic resin, said liquid crystal polyester being a continuous phase and said thermoplastic resin being a disperse phase, and having a ratio (viscosity 1/viscosity 2) of 0.1 through 0.7 wherein said viscosity 1 is a melt viscosity measured at the flow temperature defined below with at least one shear rate selected from a shear rate 100 sec$^{-1}$ and a shear rate 1,000 sec$^{-1}$ and said viscosity 2 is a melt viscosity measured at a temperature higher than said flow temperature by 20° C. with the same shear rate as that in the melt viscosity at the flow temperature;

Flow temperature: a temperature at which the melt viscosity of a resin is 48,000 poise when the resin heated at a temperature-raising rate of 4° C./minute is extruded from a nozzle of 1 mm in inside diameter and 10 mm in length under a load of 100 Kgf/cm$^2$.

[2] A liquid crystal polyester resin composition film made of a liquid crystal polyester resin composition comprising (A) 56 through 99% by weight of a liquid crystal polyester and (B) 44 through 1% by weight of a thermoplastic resin having an epoxy group and molded with uniaxial orientation, with biaxial orientation, by blown film extrusion or by laminating.

DETAILED DESCRIPTION OF THE INVENTION

The present invention is described in more detail in the followings.

The liquid crystal polyester as the component (A) in the liquid crystal polyester resin composition used in the present invention is a polyester called thermotropic liquid crystal polymer.

Specifically, said polyester includes:
(1) one produced from a combination of an aromatic dicarboxylic acid, an aromatic diol and an aromatic hydroxycarboxylic acid,
(2) one produced from a combination of different kinds of aromatic hydroxycarboxylic acids,
(3) one produced from a combination of an aromatic dicarboxylic acid and a nucleus substituted aromatic diol, and
(4) one obtainable by the reaction of a polyester such as polyethylene terephthalate or the like and an aromatic hydroxycarboxylic acid, all forming isotropic melt at a temperature of 400° C. or below. The aromatic dicarboxylic acid, the aromatic diol, and the aromatic hydroxycarboxylic acid may be replaced by ester derivatives thereof. Exemplified repeating units of the liquid crystal polyester are given below although the liquid crystal polyester is not limited to these structures.

Repeating units originating from aromatic dicarboxylic acids:

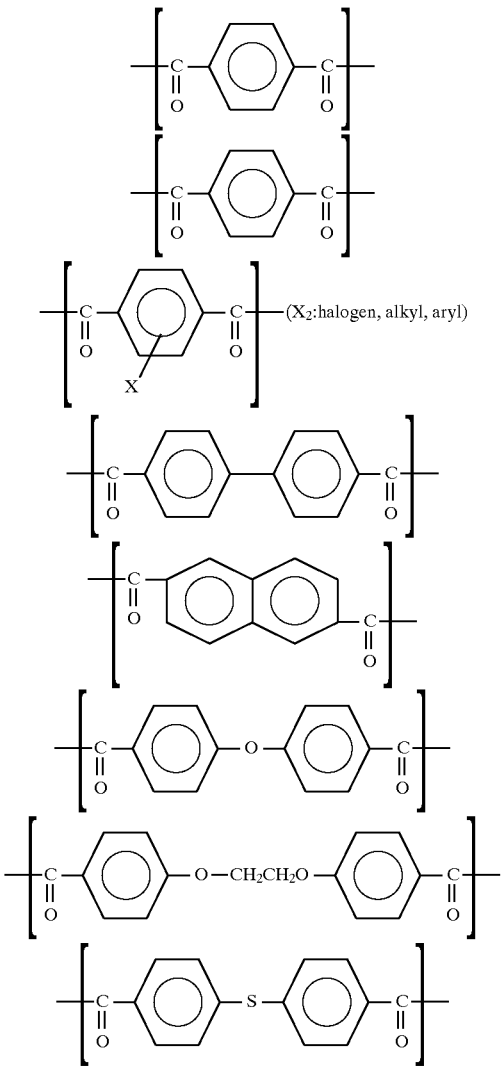

Repeating units originating from aromatic diols:

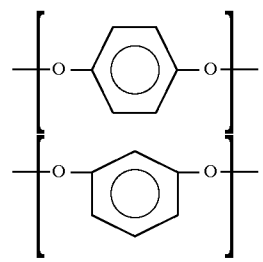

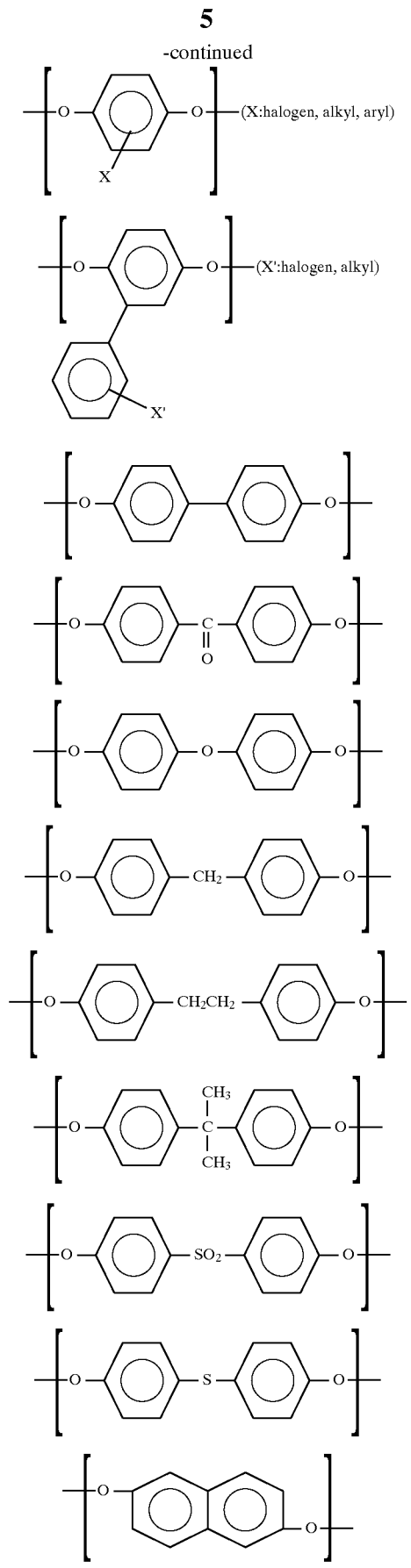
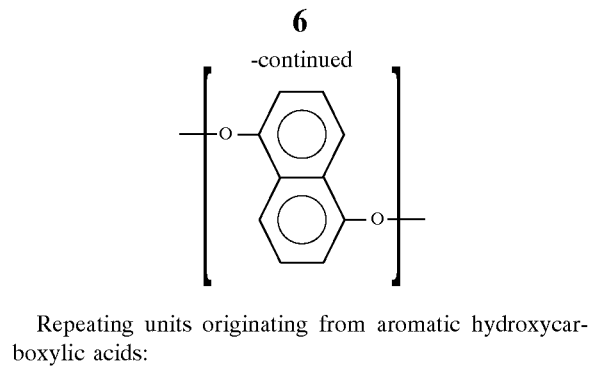
Repeating units originating from aromatic hydroxycarboxylic acids:
Particularly preferred liquid crystal polyesters because of well-balanced heat resistance, mechanical properties and processibilities have the following repeating unit:
and more specifically a combination of repeating units (I) through (V):

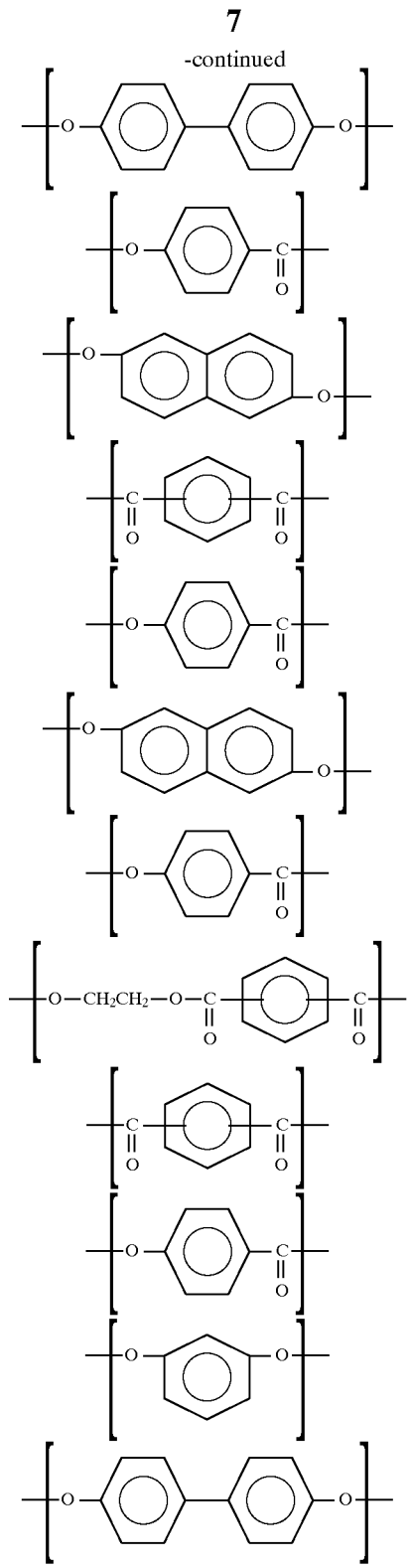

(II)

(III)

(IV)

(V)

The liquid crystal polyesers (I), (II), (III) and (IV) are described, for example, in JP-B-47-47870, JP-B-63-3888, JP-B-63-3891, JP-B-18016 and others. Preferred combinations of units are combinations (I) and (II).

For application of the laminate according to the invention to fields in which a higher heat resistance is required, the liquid crystal polyester of component (A) in the liquid crystal polyester resin composition preferably includes 30 through 80% by mole of a repeating unit (a'), 0 through 10% by mole of a repeating unit (b'), 10 through 25% by mole of a repeating unit (c'), and 10 through 35% by mole of a repeating unit (d'):

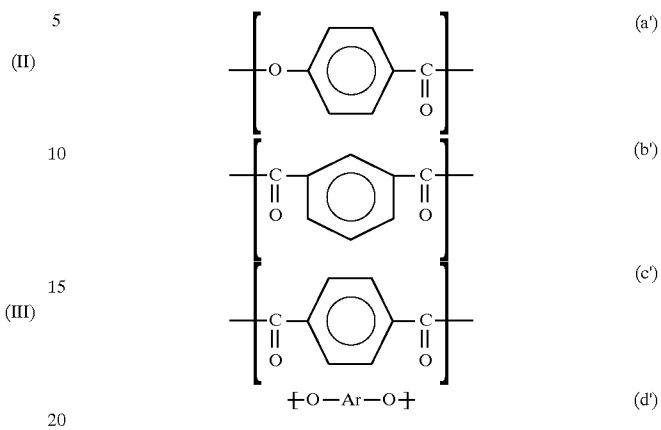

wherein Ar represents a divalent aromatic group.

Among the preferred combinations for the various application fields as described above in the liquid crystal polyester resin composition to be used in the present invention, the liquid crystal polyesters consisting of a combination of elements including only carbon, hydrogen and oxygen are particularly preferred for a field in which easiness of discarding after use, such as incineration, is required from the viewpoint of the environmental problems.

The component (B) in the liquid crystal polyester resin composition used in the present invention is a thermoplastic resin. In said liquid crystal polyester resin composition, the liquid crystal polyester constitutes a continuous phase and the thermoplastic resin constitutes a disperse phase. Further, the liquid crystal polyester resin composition used in the present invention is a liquid crystal resin composition having a ratio (viscosity 1/viscosity 2) of 0.1 through 0.7 wherein said viscosity 1 is a melt viscosity measured at a temperature at which the resin begins to form an anisotropic molten phase (i.e. flow temperature) with at least one shear rate selected from a shear rate 100 sec$^{-1}$ and a shear rate 1,000$^{-1}$ and said viscosity 2 is a melt viscosity measured at a temperature higher than said flow temperature by 20° C. with the same shear rate as that in the melt viscosity at the flow temperature. The thermoplastic resin as the component (B) is not limited insofar as the thermoplastic resin meets the above criteria.

In the present invention, it is preferable to use an epoxy group-containing ethylene copolymer as the component (B) in the liquid crystal polyester resin composition. The epoxy group-containing ethylene copolymer refers to an epoxy group-containing ethylene copolymer comprising: (a) 50 through 99.9% by weight, preferably 60 through 99% by weight, of an ethylene unit; (b) 0.1 through 30% by weight, preferably 0.5 through 25% by weight, of a glycidyl (unsaturated) carboxylate unit or an unsaturated glycidyl ether unit; and (c) 0 through 50% by weight, preferably 0.5 through 40% by weight, of an ethylenically unsaturated ester compound unit.

Compounds capable of providing the glycidyl (unsaturated) carboxylate unit and the unsaturated glycidyl ether unit (b) in the epoxy group-containing ethylene copolymer (B) are represented by the following formulae:

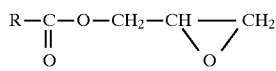

wherein R represents a hydrocarbon group having an ethylenically unsaturated bond and containing 2 through 13 carbon atoms,

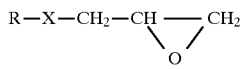

wherein R represents a hydrocarbon group having an ethylenically unsaturated bond and containing 2 through 18 carbon atoms and X denotes —CH$_2$—O— or a group:

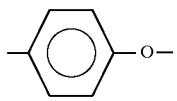

Specific examples include glycidyl acrylate, glycidyl methacrylate, glycidyl itaconate, allyl glycidyl ether, 2-methylallyl glycidyl ether, styrene-p-glycidyl ether and the like.

The epoxy group-containing ethylene copolymer referred to in the present invention may be a terpolymer or multi-unit copolymers containing ethylene, glycidyl (unsaturated) carboxylate or unsaturated glycidyl ether, and ethylenically unsaturated ester compound (c).

Examples of ethylenically unsaturated ester compounds (c) include vinyl carboxylates and alkyl α, β-unsaturated carboxylates, such as vinyl acetate and vinyl propionate, methyl acrylate, ethyl acrylate, butyl acrylate, methyl methacrylate, ethyl methacrylate, and butyl methacrylate. Vinyl acetate, methyl acrylate, and ethyl acrylate are particularly preferred.

Examples of the epoxy group-containing ethylene copolymers (B) used in the present invention include a copolymer comprising ethylene units and glycidyl methacrylate units, a copolymer comprising ethylene units, glycidyl methacrylate units and methyl acrylate units, a copolymer comprising ethylene units, glycidyl methacrylate units and ethyl acrylate units, a copolymer comprising ethylene units, glycidyl methacrylate units and vinyl acetate units, and the like.

The melt index (hereinafter may be referred to as MFR: measured at 190° C. under a load of 2.16 kg in conformity with JIS K6760) of the epoxy group-containing ethylene copolymer (B) is preferably in a range of 0.5 through 100 g/10 minutes and more preferably in a range of 2 through 50 g/10 minutes. The melt index outside the range is allowable but the index greater than 100 g/10 minutes results in poor mechanical properties of the resulting resin composition while that less than 0.5 g/10 minutes lowers the compatibility with the liquid crystal polyester of component (A) and therefore both cases are not preferred.

The epoxy group-containing ethylene copolymer (B) preferably has stiffness modulus in a range of 10 through 1300 kg/cm$^2$ and more preferably in a range of 20 through 1100 kg/cm$^2$. The stiffness modulus out of the above range is not preferred because it may result in insufficient film-molding processibility of the resulting resin composition and insufficient mechanical properties of the resulting film.

The epoxy group-containing ethylene copolymer (B) is prepared by copolymerizing an unsaturated epoxy compound and ethylene in the presence of a radical polymerization initiator at 500 through 4000 atm and 100° through 300° C. in the presence or absence of an appropriate solvent and a chain transfer agent. Alternatively, it may be produced by mixing polyethylene with an unsaturated epoxy compound and radical polymerization initiator and then melt-graft-copolymerizing in an extruder.

In the liquid crystal polyester resin composition used in the present invention, the liquid crystal polyester constitutes the continuous phase and the thermoplastic resin constitutes the disperse phase. Constitution of the continuous phase by the thermoplastic resin is not preferred because gas-barrier properties are deteriorated.

The liquid crystal polyester resin composition used in the present invention is a liquid crystal resin composition having a ratio (viscosity 1/viscosity 2) of 0.1 through 0.7 wherein said viscosity 1 is a melt viscosity measured at a temperature at which the resin begins to form an anisotropic molten phase (i.e. flow temperature) with at least one shear rate selected from a shear rate 100 sec$^{-1}$ and a shear rate 1,000$^{-1}$ and said viscosity 2 is a melt viscosity measured at a temperature higher than said flow temperature by 20° C. with the same shear rate as that in the melt viscosity at the flow temperature.

Preferred liquid crystal polyester resin composition has the ratio of 0.1 through 0.5. If the ratio is less than 0.1, the film-molding may be difficult and improvement of anisotropy in the tensile strength of the produced film may be insufficient while if the ratio is more than 0.7, film-molding may be difficult. Therefore, both cases are not preferred.

The flow temperature is defined as a temperature at which the melt viscosity of a resin is 48,000 poise when the resin heated at a temperature-raising rate of 4° C./minute is extruded from a nozzle of 1 mm in inside diameter and 10 mm in length under a load of 100 Kgf/cm$^2$.

As regards the ratio of the component (A) to the component (B) included in the liquid crystal polyester resin composition of the invention, the content of the component (A) is 56.0 through 99.0% by weight, preferably 65.0 through 99.0% by weight and more preferably 70.0 through 98.0% by weight while the content of the component (B) is within a range of 44.0 through 1.0% by weight, preferably 35.0 through 1.0% by weight and more preferably 30.0 through 2.0% by weight. The content of the component (A) less than 56.0% by weight deteriorates the film-molding processibility and lowers the gas-barrier properties and the tensile strength of the film produced from the composition. The same greater than 99.0% by weight may not sufficiently improve anisotropy in the tensile strength of the produced film.

While combination of the components (A) and (B) in the liquid crystal resin composition used in the present invention may freely be varied within the above range according to use, a combination consisting of elements including only carbon, hydrogen and oxygen are particularly preferred from the viewpoint of the environmental problems.

It is preferred that the flow temperature (FT1) of the liquid polyester resin composition used in the present invention is higher than the flow temperature (FT2) of the liquid polyester of the component (A) by 10° C. Also it is preferred that FT1 is higher than FT2. If FT1 is lower than FT2 by 10° C., the mechanical properties of the composition may be inferior.

The liquid crystal polyester resin composition used in the invention may be manufactured by any known method without particular limitation. For example, the component dissolved in a solvent are mixed and recovered by evaporation of the solvent or precipitation. An industrially preferable method is to knead the components in the molten state. Known kneading apparatus including single screw extruders, twin-screw extruders, and various kneaders are applicable to the melt-kneading process. Especially, biaxial high-speed kneaders are preferably applied.

For the kneading process, the temperature in the cylinders of the kneading machine is set preferably in a range of 200° through 360° C. and more preferably in a range of 230° through 340° C.

Each component may be pre-mixed to the homogeneous state with a tumbling mixer or Henschel mixer. However, the components may be separately introduced quantitatively into a kneader without pre-mixing.

The kneaded composition can be molded by various kinds of film-molding processes. Alternatively, the resin composition of the present invention may be prepared by kneading in the course of melt-processing for molding of a dry-blend, without pre-kneading, in order to give a molded product directly.

An inorganic filler may be added, if desired, to the liquid crystal polyester resin composition used in the invention. Examples of the applicable inorganic filler include talc, clay, fillers for intercalation such as montmorillonite and the like.

Various additives may also be added to the liquid crystal polyester resin composition used in the present invention, if desired, in the preparation process or the subsequent processing process. Such additives include organic fillers, antioxidants, heat stabilizers, light stabilizers, flame retardants, lubricants, antistatic agents, inorganic or organic colorants, rust preventives, crosslinking agents, foaming agents, fluorescent agents, surface smoothing agents, surface gloss improvers and mold release agents such as fluoropolymers.

The liquid crystal polyester resin composition film of the present invention can usually be produced by a method in which the liquid crystal polyester resin composition obtained as above is melt-kneaded in an extruder and the molten resin extruded through a die is wound up. Alternatively, the film may be prepared by kneading the components in the course of melt-processing for molding of a dry-blend to form the resin composition, without pre-kneading, which in turn gives a molded product directly. Usually, T-formed die (hereinafter may be referred to as T-die) can be used as the die.

Conditions for the extruder used in molding may be chosen depending on a particular composition. The temperature of the cylinder is preferably within a range of 200° through 360° C. and more preferably within a range of 230° through 340° C. If the temperature is outside this range, the composition may be heat-decomposed or be difficult to be molded into a film.

Preferred opening of the slit of the T-die (2) is 0.2 through 1.2 mm. While the thickness of the liquid crystal polyester resin composition film of the present invention may be controlled within a range of 1 through 1,000 $\mu$m, a film of 5 through 100 $\mu$m in thickness is frequently used in practice and preferred. Preferred draft ratio in the uniaxial orientation of the liquid crystal polyester resin film of the present invention is within a range of 1.1 through 40, preferably 10 through 40 and more preferably 15 through 40. The term draft ratio herein refers to an amount of sectional area of the slit of T-die divided by sectional area crossing the machine direction of the film. If the draft ratio is less than 1.1, the strength of the film is insufficient and if the draft ratio exceeds 40.0, the surface smoothness may be insufficient. Therefore both cases are not preferred. The draft ratio can be adjusted by controlling the conditions of the extruder and rate of winding up.

The biaxial orientation in the production of the liquid crystal polyester resin composition film is not particularly limited and specifically includes stepwise drawing in which the molten composition extruded from the T-die is first uniaxially drawn in MD (machine direction) and then drawn in TD (transverse direction), concurrent drawing in which the sheet extruded from the T-die is drawn concurrently in MD and TD), or alternatively, a method in which the un-drawn sheet extruded from the T-die is stepwisely or concurrently drawn by a biaxial stretching machine or a tenter.

In any method, preferably the molding temperature is (the flow temperature of the liquid crystal resin composition of the invention minus 60° C.) or above and (the flow temperature plus 60° C.) or below and more preferably the film-molding temperature is the flow temperature or above and (the flow temperature plus 30° C.) or below.

Preferred opening of the slit of the T-die is 0.2 mm through 1.2 mm. While stretch ratio may be set depending on the molding method, in the case of biaxial stretcher, for example, the stretch ratio as defined by (length after stretching/original length) is 1.2 through 20.0 and preferably 1.5 through 5.0 in each of MD and TD directions. When the stretch ratio is less than 1.2, the stretching effect may be too little and if the value is more than 20.0, the smoothness of the film may be insufficient.

In the blown film extrusion, the liquid crystal polyester resin composition obtained is fed to a melt-kneading extruder having a die with a circular slit, melt-kneaded at a cylinder temperature of 200° through 360° C., preferably 230° through 350° C., and extruded upwardly or downwardly through the circular slit of the extruder in the form of a tubular film. The circular die gap is usually 0.1 through 5 mm and preferably 0.2 through 2 mm. The diameter of the slit is usually 20 through 1,000 mm and preferably 25 through 600 mm.

The melt-extruded tubular molten resin film is drafted along the machine direction (MD) and also drafted with expansion in a direction perpendicular to the machine direction (TD) by blowing the air or a inert gas, for example, nitrogen gas or the like inside the tubular film.

In the blown film extrusion method of the liquid crystal polyester resin composition in the present invention, preferred blow ratio is 1.5 through 15, preferably 2.5 through 15 and preferred MD draft ratio is 1.5 through 40, preferably 2.5 through 30.

The MD draft ratio is defined as (area of circular slit)/(sectional area of film) and the TD draft ratio, i.e. the blow ratio is defined by (diameter of tubular film)/(diameter of dies).

If the conditions for blown film extrusion are outside the above range, it is difficult to obtain a film of liquid crystal polyester resin composition with uniform thickness, without wrinkles and of high strength.

The expanded film is cooled at the tubular surface with the air or water and then taken up through nip rolls.

In the blown film extrusion, conditions may be selected so that the tubular molten film is expanded in a state in which the thickness is uniform and the surface is smooth, depending on the constitution of the liquid crystal polyester resin composition.

The practical thickness of the film obtainable from the liquid crystal polyester resin composition used in the present invention is not limited but preferably within a range of 1 through 500 $\mu$m and more preferably within a range of 1 through 200 $\mu$m.

The present invention also encompasses a laminated blown film of a liquid crystal polyester resin composition film and a thermoplastic resin film.

Said thermoplastic resin may be any other thermoplastic resin than the liquid crystal polyester or the liquid crystal polyester resin composition and includes as preferred examples, without limitation, polyolefins such as polyethylene and polypropylene, polystyrene, polycarbonate, polyesters such as polyethylene terephthalate and polybutylene terephthalate, polyacetal, polyamide, polyphenylene ether, polyethersulfone, ethylene-vinylacetate copolymer, polyvinylchloride, polyvinylidenechloride, fluoro-resin, polyphenylenesulfide and the like. Among them, polyethylene, polypropylene and polyethylene terephthalate are preferred. The thermoplastic resin can be used solely or as a mixture of two or more. As used herein, the thermoplastic resin includes those modified by introducing a functional group into the molecular chain.

The methods of producing the laminated blown film is not particularly limited and include a method in which component molten resins are piled in a die and extruded from the circular die, a method in which molten resins are separately extruded from dies and then piled and a method in which molten resins are piled before a die and extruded from the circular die. A practical method is selected depending on the desired use.

The methods of producing the laminated film consisting of the liquid crystal polyester resin composition film and a thermoplastic resin film include a co-extruding method. The co-extruding method is not limited in apparatus and system and include, for example, the multimanifold system in which component molten sheets are piled in a T-die, the multislot system in which molten resins are separately extruded from dies and then piled and the feed block system in which molten resins are piled before a die and extruded from the T-die. A laminating method is selected depending on the desired use.

Said thermoplastic resin may be any other thermoplastic resin than the liquid crystal polyesters described above or the liquid crystal polyester resin composition. As preferred example, such thermoplastic resins used in producing a laminate blown film as exemplified above are also usable.

Manners of lamination for the laminated film include at least a manner in which the thermoplastic resin film(s) is/are laminated on one or both side(s) of the liquid crystal polyester resin composition film. Numbers of laminated layers are not particularly limited and may usually be about 2 through 10 and preferably about 2 through 5 including at least one liquid crystal resin layer.

The temperature for extruding the liquid crystal polyester resin composition in co-extruding may be chosen depending on a particular composition and is usually the flow temperature of the liquid crystal polyester resin composition or above and preferably within a range of 280° through 360° C.

Conditions for the extruder for thermoplastic resin used in co-extruding may be chosen depending on a particular nature of the thermoplastic resin. The temperature of the cylinder is preferably within a range of 200° through 360° C. and more preferably within a range of 230° through 350° C. If the temperature is outside this range, the composition may be heat-decomposed or be difficult to be molded into a film.

The liquid crystal polyester resin composition film and the thermoplastic resin film in the laminated film obtained by the co-extrusion are well adhered without using an adhesive.

The thickness of the laminated film obtainable in the present invention can be controlled within a range of 1 through 1,000 μm and is frequently within a range of 5 through 100 μm for practical use.

The liquid crystal polyester resin composition used in the present invention has an improved behavior in molten state which has been extraordinary in and drawback of the conventional liquid crystal polyesters, is easily processed in molding such as film-molding. Said liquid crystal polyester resin composition can be molded by the process according to the present invention into a practically usable film retaining excellent properties of the liquid crystal polyesters such as mechanical strength, heat resistance and gas-barrier properties and having decreased anisotropy in strength of film.

The liquid crystal polyester resin composition film according to the present invention found wide applications, making use of the above described excellent properties, including gas-barrier films, heat resistant films and the like, specifically, films for wrapping food, films for wrapping chemical, films for wrapping cosmetic, films for wrapping electronic and so on. Further, by choosing thermoplastic resin adequately, it is possible to obtain a film composed of elements consisting only of carbon, hydrogen and oxygen and thus easily discardable, yet retaining the above described excellent properties.

While a clear explanation has not been made on the reasons for the fact that the liquid crystal polyester resin composition film has the excellent properties such as excellent gas-barrier properties, tensile strength, relief of anisotropy in tensile strength or the like, it is assumed that a chemical reaction occurs between the liquid crystal polyester and the epoxy group-containing ethylene copolymer and as the result the compatibility between the liquid crystal polyester and the epoxy group-containing ethylene copolymer is improved.

EXAMPLES

The present invention will now be illustrated by means of Examples which are given for illustration purpose only and should not be construed as a limitation upon the scope of the invention.

(1) Measurement of Physical Properties

Flow temperature: Measurement was effected using a Koka flow tester CFT-500 manufactured by Shimadzu Corporation. Briefly, a temperature was measured at which the melt viscosity of a resin is 48,000 poise when the resin heated at a temperature-raising rate of 4° C./minute is extruded from a nozzle of 1 mm in inside diameter and 10 mm in length under a load of 100 Kgf/cm$^2$.

Melt viscosity: Melt viscosity was measured using a capilograph 1B, manufactured by Toyo Seiki, with a die having a diameter of 0.5 mm and at a shear rate of 100/sec and 1,000/sec.

Temperature of deflection under load (TDUL): A test piece for TDUL measurement (127 mm in length, 12.7 mm in width and 6.4 mm in thickness) was molded by injection and tested for TDUL (under a load of 18.6 kg) according to ASTM D648.

Soldering heat resistance temperature: A JIS No. 1 (½) dumbbell of 0.8 mm in thickness was dipped in a bath of molten solder at 260° C. consisting of 60% of tin and 40% of lead, kept in the bath at the same temperature for 60 seconds, taken out and assessed for external appearance. The test was repeated stepwisely elevating the temperature by 10° C. until the maximum temperature without foaming or deformation of the piece was known. For example, when foaming or deformation of the piece is observed for the first time at 310° C., the soldering heat resistance temperature is 300° C.

Tensile strength of film: Measurement was effected according to ASTM D882 using a No. 2 test piece at a test speed of 20 mm per minute.

Oxygen permeability: Measurement was effected according to JIS K7126 A at 20° C. The results were expressed in cc/m$^2$.24 hr.1 atm.

Water vapor permeability: Measurement was effected according to JIS Z0208 cup method under conditions comprising a temperature of 40° C. and a relative humidity of 90%. The results were expressed in g/m².24 hr.1 atm.

The oxygen permeability and water vapor permeability were converted into values for films of 25 μm in thickness.

Observation of morphology: A section of dumbbell test piece was polished before etching with chloroform and observed by a scanning electron microscope. The results of observation were scored by the following criteria:

A: The thermoplastic resin forms a clear disperse phase in the liquid crystal polyester.

B: The thermoplastic resin is continuous without forming a clear disperse phase.

Adhesiveness: The adhesiveness between films of a laminate film was scored by the following criteria:

○: Adherence was good and films were not easily peeled.

Δ: Films were easily peeled.

(2) Liquid crystal polyester as component (A)

(i) A mixture containing 10.8 kg (60 moles) of p-acetoxybenzoic acid, 2.49 kg (15 moles) of terephthalic acid, 0.83 kg (5 moles) of isophthalic acid, and 5.45 kg (20.2 moles) of 4,4'-diacetoxydiphenyl was placed in a polymerization vessel equipped with a comb-type agitator and stirred in a nitrogen atmosphere while elevating the temperature up to 330° C. The mixture was polymerized at 330° C. for an hour with vigorous stirring while acetic acid produced as a by-product was continuously removed. The system was gradually cooled to 200° C., at which the polymer obtained was taken out of the system.

The polymer obtained was ground to particles of not greater than 2.5 mm in diameter with a hammer mill (manufactured by Hosokawa Micron Co., Ltd.). The polymer particles were treated in a nitrogen atmosphere at 280° C. in a rotary kiln for three hours, so that granules of aromatic polyester having a flow temperature of 324° C. and consisting of repeating units shown below were obtained. The liquid crystal polyester thus obtained is hereinafter referred to as A-1. The polymer showed optical anisotropy under the pressurizing condition at temperatures of not less than 340° C., and the flow temperature was 320° C. The ratio of the repeating units of the polyester A-1 is given as follows:

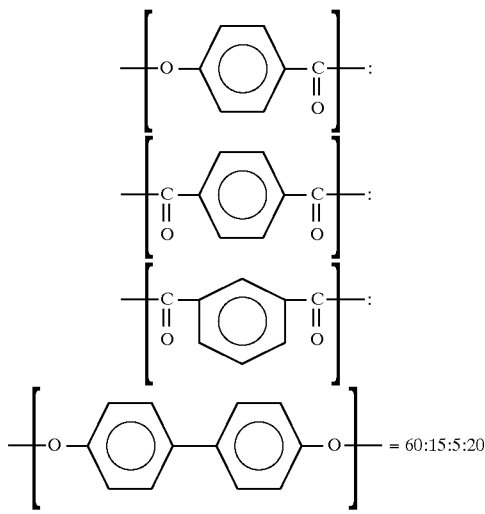

(ii) A mixture containing 16.6 kg (12.1 moles) of p-hydroxy-benzoic acid, 8.4 kg (4.5 moles) of 6-hydroxy-2-naphthoic acid, and 18.6 kg (18.2 moles) of acetic anhydride was placed in a polymerization vessel equipped with a comb-type agitator and stirred in a nitrogen atmosphere while elevating the temperature up to 320° C. The mixture was polymerized at 320° C. for an hour and under a reduced pressure of 2.0 torr at 320° C. for another hour while acetic acid produced as a by-product was continuously removed from the system. The system was gradually cooled to 180° C., at which the polymer obtained as taken out of the system.

The polymer obtained was ground to particles in the same manner as the process (i) and treated in a nitrogen atmosphere at 240° C. in a rotary kiln for five hours, so that granules of aromatic polyester having a flow temperature of 270° C. and consisting of repeating units shown below were obtained. The liquid crystal polyester thus obtained is hereinafter referred to as A-2. The polymer showed optical anisotropy under the pressurizing condition at temperatures of not less than 280° C., and the flow temperature was 263° C. The ratio of the repeating units of the polyester A-2 is given as follows:

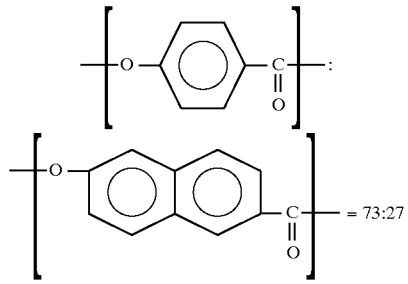

(2) Epoxy group-containing thermoplastic resin as component (B)

The composition (weight ratio), MFR and stiffness modulus for the epoxy group-containing ethylene copolymer are shown below. MFR was measured at 190° C. under a load of 2.16 kg and shown in g/10 min. Modulus of elasticity was measured according to ASTM D747.

B-1: a copolymer produced by high-pressure radical polymerization (manufactured by Sumitomo Chemical Co., Ltd., trade name: Bondfast 7L)

Composition: ethylene/glycidyl
methacrylate/methyl acrylate=67/3/30 (by weight)

MFR=9

Stiffness modulus=60 kg/cm²

B-2: a copolymer produced by high-pressure radical polymerization (manufactured by Sumitomo Chemical Co., Ltd., trade name: Bondfast 20B)

Composition: ethylene/glycidyl
methacrylate/vinyl acetate=83/12/5 (by weight)

MFR=20

Stiffness modulus=430 kg/cm²

B-3: a copolymer produced by high-pressure radical polymerization (manufactured by Sumitomo Chemical Co., Ltd., trade name: Bondfast E.)

Composition: ethylene/glycidyl methacrylate=88/12 (by weight)

MFR=3

Stiffness modulus=700 kg/cm²

B-4: a copolymer produced by high-pressure radical polymerization

Composition: ethylene/glycidyl
methacrylate/methyl acrylate=93.5/0.5/6.0 (by weight)

MFR=6

Stiffness modulus=1,380 kg/cm²

B-5: a product obtained by melt-kneading a composition consisting of 100 parts by weight of a low density polyethylene (manufactured by Sumitomo Chemical Co., Ltd., trade name: Sumikasen F-101-1) and 1.2 part by weight of glycidyl methacrylate using a twin screw extruder while removing volatile substance

MFR=6

Stiffness modulus=1,900 kg/cm$^2$

B-6: manufactured by Sumitomo Chemical Co., Ltd., trade name: Bondfast 2C

Composition: ethylene/glycidyl methacrylate=94/6 (by weight)

MFR=3

Stiffness modulus=1,000 kg/cm$^2$

B-7: a copolymer produced by high-pressure radical polymerization

Composition: ethylene/glycidyl methacrylate/methyl acrylate=65/20/15 (by weight)

MFR=20

Stiffness modulus=130 kg/cm$^2$

B-8: manufactured by Sumitomo Chemical Co., Ltd., trade name: Bondfast 7B

Composition: ethylene/glycidyl methacrylate/vinyl acetate=83/12/15 (by weight)

MFR=7

Stiffness modulus=400 kg/cm$^2$

B-9: manufactured by Sumitomo Chemical Co., Ltd., trade name: Bondfast 7M

Composition: ethylene/glycidyl methacrylate/methyl acrylate=64/6/30 (by weight)

MFR=9

Stiffness modulus=40 kg/cm$^2$

B-10:

Composition: ethylene/glycidyl methacrylate/ethyl acrylate=60/6/34 (by weight)

MFR=7

Stiffness modulus=30 kg/cm$^2$

Examples 1 through 6 and Comparative Examples 1 through 5

The respective components were blended with a Henschel mixer according to the compositions shown in Table 1. Each composition was kneaded at a cylinder temperature of 290° through 360° C. and a screw speed of 200 rpm with a twin-screw extruder TEX-30 manufactured by Nihon Seiko Co., Ltd. to give pellets of a resin composition. A test piece for measuring the temperature of deflection under load was molded with an injection molding device PS40E5ASE manufactured by Nissei Resin Industries Co., Ltd. at a molding temperature of 290° through 360° C. and a die temperature of 80° C. and assayed for TDUL. The results are shown in Table 1 and Table 2.

A film was produced as follows: The pellets of the resin composition obtained by kneading as above was melt-kneaded at a cylinder temperature of 310° through 360° C. and a screw speed of 80 rpm with a single screw extruder (VS20-20, manufactured by Tanabe Plastics Co., Ltd.) having a diameter of 20 mm and equipped with a T-die as schematically shown in FIG. 1. The composition was extruded from the T-die having a slit width of 100 mm and a die gap of 0.5 mm winding up the film at a rate of 2 through 8 m/min through pressure rollers heated to 170° through 250° C. to give a film having a thickness of 15 through 50 μm. The film obtained as above was assayed for gas permeability test. The results are shown in Table 2. In the Comperative Examples 1–5, films were not obtained.

TABLE 1

| | Composition (% by weight) | | | Melt-kneading Cylinder temp. (°C.) | Flow temp. (°C.) | Melt viscosity Measured at FT (poise) | | Melt viscosity Measured at FT + 20° C. (poise) | | Melt viscosity ratio | |
|---|---|---|---|---|---|---|---|---|---|---|---|
| | (A) | (B) | Others | | | 100 sec$^{-1}$ | 1000 sec$^{-1}$ | 100 sec$^{-1}$ | 1000 sec$^{-1}$ | 100 sec$^{-1}$ | 1000 sec$^{-1}$ |
| Example 1 | A-1 90 | B-1 10 | 0 | 360 | 323 | 43000 | 7600 | 6100 | 1300 | 0.142 | 0.171 |
| Example 2 | A1 90 | B-4 10 | 0 | 360 | 324 | 45000 | 8100 | 1400 | 1400 | 0.142 | 0.173 |
| Example 3 | A-1 65 | B-1 35 | 0 | 360 | 339 | 32600 | 6500 | 9900 | 2700 | 0.304 | 0.415 |
| Comparative Example 1 | A-1 100 | 0 | 0 | 360 | 320 | 48000 | 8200 | 300 | 700 | 0.063 | 0.085 |
| Comparative Example 2 | A-1 90 | 0 | *1 10 | 350 | 309 | 40300 | 6100 | 3300 | 900 | 0.082 | 0.148 |
| Example 4 | A-1 85 | B-4 15 | 0 | 360 | 325 | 42500 | 7400 | 6600 | 1700 | 0.155 | 0.230 |
| Example 5 | A-1 94 | B-5 6 | 0 | 360 | 321 | 45200 | 8300 | 5900 | 1300 | 0.131 | 0.157 |
| Example 6 | A-2 80 | B-6 20 | 0 | 300 | 266 | 40700 | 7500 | 15600 | 3400 | 0.383 | 0.453 |
| Comparative Example 3 | A-2 80 | B-7 20 | 0 | 300 | 250 | 41300 | 7900 | 12100 | 2800 | 0.293 | 0.354 |

TABLE 1-continued

| | Composition (% by weight) | | | Melt-kneading Cylinder temp. (°C.) | Flow temp. (°C.) | Melt viscosity | | | | | |
|---|---|---|---|---|---|---|---|---|---|---|---|
| | | | | | | Melt viscosity Measured at FT (poise) | | Melt viscosity Measured at FT + 20° C. (poise) | | Melt viscosity ratio | |
| | (A) | (B) | Others | | | 100 sec⁻¹ | 1000 sec⁻¹ | 100 sec⁻¹ | 1000 sec⁻¹ | 100 sec⁻¹ | 1000 sec⁻¹ |
| Comparative Example 4 | A-2 100 | 0 | 0 | 300 | 263 | 56000 | 9200 | 4900 | 1500 | 0.082 | 0.163 |
| Comparative Example 5 | A-2 80 | 0 | *1 20 | 290 | 241 | 43600 | 8300 | 10900 | 2400 | 0.250 | 0.289 |

*1: Polyethylene manufactured by Sumitomo Chemical Co., Ltd., trade name Sumikasen F-101-1 (Stiffness modulus = 2300 kg/cm², MI = 7)

TABLE 2

| | Injection molding | | | Film molding | | | | | Film properties | |
|---|---|---|---|---|---|---|---|---|---|---|
| | Cylinder temp. (°C.) | TDUL (°C.) | Morphology | Cylinder temp. (°C.) | Pressure roll temp. (°C.) | Winding up speed (m/min) | Draft ratio | Film thickness ($\mu$m) | Water vapor permiability (g/m² · 24 hr · atm) | Oxygen permiability cc/m² · 24 hr · atm |
| Example 1 | 360 | 241 | A | 360 | 250 | 6 | 17 | 26 | 0.3 | 0.2 |
| Example 2 | 360 | 234 | A | 360 | 250 | 6 | 19 | 41 | 0.4 | 0.3 |
| Example 3 | 360 | 159 | A | 360 | 250 | 6 | 30 | 33 | 0.7 | 0.5 |
| Comparative Example 1 | 360 | 262 | — | 360 | 250 | — | — | — | — | — |
| Comparative Example 2 | 350 | 188 | A | 350 | 250 | — | — | — | — | — |
| Example 4 | 360 | 219 | A | 360 | 250 | 5 | 21 | 44 | 0.5 | 0.3 |
| Example 5 | 360 | 250 | A | 360 | 250 | 2 | 8 | 50 | 0.4 | 0.2 |
| Example 6 | 300 | 154 | A | 310 | 180 | 8 | 24 | 15 | 0.3 | 0.3 |
| Comparative Example 3 | 300 | 143 | A | 310 | 180 | — | — | — | — | — |
| Comparative Example 4 | 300 | 182 | — | 310 | 180 | — | — | — | — | — |
| Comparative Example 5 | 290 | 135 | A | 310 | 170 | — | — | — | — | — |

Examples 7 through 11 and Comparative Examples 7 through 10

The respective components were blended with a Henschel mixer according to the compositions shown in Table 3. Each composition was kneaded at a cylinder temperature of 350° C. with a twin-screw extruder TEX-30 manufactured by Nihon Seiko Co., Ltd. and the flow temperature (may be referred to as FT) and melt viscosity of the produced composition were measured by the above described methods. A test piece for measuring the temperature of deflection under load and a test piece for measuring soldering heat resistance were molded with an injection molding device PS40E5ASE manufactured by Nissei Resin Industries Co., Ltd. at a molding temperature of 350° through 355° C. and a die temperature of 80° C. The results are shown in Table 3 and Table 4.

A film was produced as follows: The pellets of the composition obtained by kneading as above was fed to a single screw extruder (manufactured by Tanabe Plastics Machine Co.) having a diameter of 20 mm and extruded from a T-die having a slit width of 100 mm and a die gap of 0.8 mm at a temperature of 350° C. winding up the film with cast rollers to give an un-stretched film. The film was subjected to concurrent biaxial orientation using a biaxial orientation test machine (manufactured by Toyo Seiki) at a drawing temperature of flow temperature plus 20° C. and draft ratios (MD×TD) shown in Table 4. Films having thicknesses defined in Examples and Comparative Examples were obtained from test materials and assayed for physical properties. The results are shown in Table 4. In Comparative Example 10, the used resin composition contained 70% by weight of the component (A-1) and 30% by weight of a low density polyethylene (manufactured by Sumitomo Chemical Co., Ltd., trade name:Sumikasen F101), and a film was not obtained. In Comperative Examples 7–9, film molding was relatively difficult. As the results of observing morphology, the products of Examples 7, 8, 9, 10, 11 and Comparative Example 7 and 10 were scored as A (the liquid crystal polyester formed a continuous phase and the thermoplastic resin formed a disperse phase) and the products of Comparative Examples 8 was scored as B (the thermoplastic resin did not form a clear disperse phase).

Examples 12 through 14 and Comparative Examples 11 through 12

The respective components were blended with a Henschel mixer according to the compositions shown in Table 5. Each composition was kneaded at a cylinder temperature of 270° through 300° C. with a twin-screw extruder PCM-30 manufactured by Ikegai Tekko Co., Ltd. and the flow temperature and melt viscosity of the produced composition were measured by the above described methods. A test piece for measuring the temperature of deflection under load and a test piece for measuring soldering heat resistance were molded with an injection molding device PS40E5ASE manufactured by Nissei Resin Industries Co., Ltd. at a molding temperature of 270° through 300° C. and a die temperature of 80° C. A film was produced as described above and assayed for physical properties as described above. The results are shown in Table 5 and Table 6. As the results of observing morphology, the products of Examples 12, 13 and 14 were scored as A and the product of Comparative Examples 11 was scored as B.

TABLE 3

| | Composition (% by weight) | | | Melt-kneading Cylinder temp. (°C.) | Flow temp. (°C.) | Melt viscosity | | | | | |
|---|---|---|---|---|---|---|---|---|---|---|---|
| | | | | | | Melt viscosity Measured at FT (poise) | | Melt viscosity Measured at FT + 20° C. (poise) | | Melt viscosity ratio | |
| | | | | | | 100 sec$^{-1}$ | 1000 sec$^{-1}$ | 100 sec$^{-1}$ | 1000 sec$^{-1}$ | 100 sec$^{-1}$ | 1000 sec$^{-1}$ |
| | (A) | (B) | Others | | | | | | | | |
| Example 7 | A-1 97 | B-1 3 | 0 | 350 | 323 | 48000 | 8200 | 5100 | 1100 | 0.106 | 0.134 |
| Example 8 | A-1 90 | B-1 10 | 0 | 350 | 324 | 44000 | 7800 | 6300 | 1400 | 0.143 | 0.179 |
| Example 9 | A-1 70 | B-6 30 | 0 | 350 | 339 | 37000 | 6800 | 9500 | 2150 | 0.257 | 0.316 |
| Example 10 | A-1 70 | B-7 30 | 0 | 350 | 320 | 33000 | 6500 | 9700 | 2600 | 0.294 | 0.400 |
| Example 11 | A-1 60 | B-1 40 | 0 | 350 | 309 | 32000 | 6400 | 10000 | 2800 | 0.312 | 0.438 |
| Comparative Example 7 | A-1 99.5 | B-1 0.5 | 0 | 350 | 325 | 48000 | 8200 | 3500 | 800 | 0.073 | 0.097 |
| Comparative Example 8 | A-1 55 | B-1 45 | 0 | 350 | 321 | 24000 | 4850 | 2800 | 410 | 0.117 | 0.285 |
| Comparative Example 9 | A-1 100 | 0 | 0 | 350 | 266 | 48000 | 8200 | 3000 | 700 | 0.063 | 0.085 |
| Comparative Example 10 | A-1 70 | 0 | *1 30 | 350 | 250 | 21000 | 4000 | 17000 | 3300 | 0.810 | 0.825 |

*1: Polyethylene manufactured by Sumitomo Chemical Co., Ltd., trade name Sumikasen F-101-1 (Stiffness modulus = 2300 kg/cm$^2$, MI = 7)

TABLE 4

| | Injection Molding Cylinder temp. (°C.) | Soldering heat resistance (°C.) | TDUL (°C.) | Film molding Temp. (°C.) | Draft ratio MD × TD | Film thickness (μm) | Tensile strength (kg/cm$^2$) | Ratio of tensile strength | Elongation at break (%) | | Oxygen permiability (cc/m$^2$ · 24 hr · atm) | Water vapor permiability (g/m$^2$ · 24 hr · atm) |
|---|---|---|---|---|---|---|---|---|---|---|---|---|
| Example 7 | 350 | 290 | 254 | 341 | 3 × 3 | 25 | 39.0 | 20.0 | 1.95 | 5.8 | 4.2 | 0.1 | 0.2 |
| Example 8 | 350 | 290 | 246 | 342 | 2.5 × 2.5 | 25 | 38.5 | 27.0 | 1.43 | 8.7 | 7.7 | 0.2 | 0.5 |
| Example 9 | 350 | 290 | 222 | 352 | 2.5 × 2.5 | 30 | 21.0 | 18.0 | 1.17 | 8.2 | 11.0 | 0.8 | 1.2 |
| Example 10 | 350 | 280 | 224 | 357 | 2.2 × 2.2 | 40 | 17.0 | 14.0 | 1.21 | 7.6 | 8.1 | 1.4 | 1.2 |
| Example 11 | 355 | 270 | 178 | 361 | 1.7 × 1.7 | 40 | 13.0 | 11.5 | 1.13 | 7.8 | 9.2 | 3.8 | 1.6 |
| Comparative Example 7 | 350 | 300 | 257 | 340 | 1.5 × 1.5 | 20 | 43.0 | 9.5 | 4.52 | 4.2 | 2.1 | <0.1 | <0.1 |
| Comparative Example 8 | 350 | <260 | 136 | 349 | 1.5 × 1.5 | 50 | 9.5 | 8.5 | 1.12 | 7.5 | 7.8 | >10 | >5 |
| Comparative Example 9 | 350 | 300 | 258 | 340 | 1.5 × 1.5 | 20 | 45.5 | 9.0 | 5.06 | 4.2 | 1.8 | Film broken | Film broken |
| Comparative Example 10 | 350 | <260 | 112 | — | — | — | — | — | — | — | — | — | — |

*1: Polyethylene manufactured by Sumitomo Chemical Co., Ltd., trade name Sumikasen F-101-1 (Stiffness modulus = 2300 kg/cm$^2$, MI = 7)

TABLE 5

| | Composition (% by weight) | | Melt-kneading Cylinder temp. (°C.) | Flow temp. (°C.) | Melt viscosity Measured at FT (poise) | | Melt viscosity Measured at FT + 20° C. (poise) | | Melt viscosity ratio | |
|---|---|---|---|---|---|---|---|---|---|---|
| | (A) | (B) | | | 100 sec$^{-1}$ | 1000 sec$^{-1}$ | 100 sec$^{-1}$ | 1000 sec$^{-1}$ | 100 sec$^{-1}$ | 1000 sec$^{-1}$ |
| Example 12 | A-2 90 | B-6 10 | 300 | 263 | 41000 | 7800 | 9700 | 2600 | 0.237 | 0.333 |
| Example 13 | A-2 70 | B-1 30 | 300 | 266 | 40000 | 6800 | 18000 | 3700 | 0.450 | 0.544 |
| Example 14 | A-2 60 | B-1 40 | 300 | 271 | 33000 | 6000 | 20000 | 4100 | 0.606 | 0.683 |
| Comparative Example 11 | A-2 50 | B-2 50 | 300 | 251 | 31000 | 5800 | 21000 | 4300 | 0.677 | 0.741 |
| Comparative Example 12 | A-2 100 | 0 | 300 | 263 | 56000 | 9200 | 4900 | 1500 | 0 | |

TABLE 6

| | Injection Molding Cylinder temp. (°C.) | TDUL (°C.) | Film molding Temp. (°C.) | Draft ratio MD × TD | Film thickness (μm) | Tensile strength (kg/mm$^2$) | Ratio of tensile strength | Elongation at break (%) | Oxygen permiability (g/m$^2$ · 24 hr · atm) | Water vapor permiability (cc/m$^2$ · 24 hr · atm) |
|---|---|---|---|---|---|---|---|---|---|---|
| Example 12 | 300 | 177 | 283 | 3 × 3 | 25 | 39.5 20.5 | 1.93 | 8.5 6.3 | 0.2 | 0.6 |
| Example 13 | 300 | 152 | 286 | 2.5 × 2.5 | 30 | 27.0 22.5 | 1.20 | 10.9 11.1 | 0.6 | 0.8 |
| Example 14 | 300 | 103 | 291 | 1.6 × 1.6 | 50 | 17.0 13.0 | 1.41 | 8.2 9.9 | 1.7 | 1.2 |
| Comparative Example 11 | 300 | 88 | — | — | — | — — | — | — — | — | — |
| Comparative Example 12 | 300 | 183 | 283 | 1.5 × 1.5 | 15 | 47.5 9.5 | 5.00 | 8.2 2.6 | Film broken | Film broken |

Examples 15 through 16 and Comparative Examples 13 through 14

The respective components were blended with a Henschel mixer according to the compositions shown in Table 7. Each composition was melt-kneaded at a cylinder temperature of 335° C. with a twin-screw extruder TEX-30 manufactured by Nihon Seiko Co., Ltd. to give a composition.

Pellets of the composition were melt-kneaded at a cylinder temperature of 347° C. and a screw revolution of 40 rpm with a single screw extruder equipped with a circular die of 30 mm in diameter. The molten resin was extruded upwardly from the circular die of 100 mm in diameter and 1.5 mm in die gap at a die temperature of 351° C. The obtained tubular film was expanded by blowing dry air into its interior space, cooled and wound up through nip rolls to give a liquid crystal polyester resin composition film.

The draft ratios of the film in the winding-up direction (MD) and the direction perpendicular to the winding-up direction (TD) were controlled by the amount of the dry air to be blown and the rate of winding up of the film. The rate of winding up, the draft ratio in MD, the blow ratio in TD and thickness of the film are shown in Table 8. Physical properties of the obtained liquid crystal polyester resin composition film are also shown in Table 8.

The draft ratio in MD was defined as (area of circular slit)/(sectional area of film) and the draft ratio in TD or blow ratio was defined as (diameter of tubular film)/(diameter of die).

Examples 17 through 18 and Comparative Example 15

The respective components were blended with a Henschel mixer according to the compositions shown in Table 7. Each composition was melt-kneaded at a cylinder temperature of 298° C. and a screw revolution of 90 rpm with a twin-screw extruder TEX-30 manufactured by Nihon Seiko Co., Ltd. to give a composition.

Pellets of the composition were melt-kneaded at a cylinder temperature of 303° C. and a screw revolution of 40 rpm with a single screw extruder equipped with a circular die of 30 mm in diameter. The molten resin was extruded upwardly from the circular die of 100 mm in diameter and 1.5 mm in lip interval at a die temperature of 303° C. The obtained tubular film was expanded by blowing dry air into its interior space, cooled and wound up through nip rolls to give a liquid crystal polyester resin composition film.

The draft ratios of the film in the winding-up direction (MD) and the direction perpendicular to the winding-up direction (TD) were controlled by the amount of the dry air to be blown and the rate of winding up of the film. The rate of winding up, the draft ratio in MD, the blow ratio in TD and thickness of the film are shown in Table 8. Physical properties of the obtained liquid crystal polyester resin composition film are also shown in Table 8.

Examples 19 and Comparative Example 16

The respective components were blended with a Henschel mixer according to the compositions for inner layer shown in Table 9. Each composition was melt-kneaded in a manner similar to that in Example 17 to give pellets of a liquid crystal polyester resin composition.

A melt of the liquid crystal polyester resin composition was extruded to a die for inner layer at a cylinder temperature of 298° C. and a screw revolution of 90 rpm with a single screw extruder of 45 mm in diameter equipped with a cylindrical die for two layers of 50 mm in diameter on the one hand, and a polyethylene, manufactured by Sumitomo Chemical Co., Ltd., trade name: Sumikasen F200 (MFR=2, stiffness modulus: 2,400 kg/cm$^2$), was extruded to a die for outer layer at a cylinder temperature of 268° C. and a screw revolution of 60 rpm with a single screw extruder of 45 mm in diameter and having an L/D of 28 on the other hand. Both the layers were joined in the die and extruded upwardly from the circular die of 1.0 mm in lip interval at a die temperature of 298° C. The obtained tubular film was expanded by blowing dry air into its interior space, cooled and wound up through nip rolls at a winding up rate of 15 m/min to give a two layered laminated film. The draft ratio and the blow ratio are shown in Table 8. The two layers of the film were well adhered and the obtained two layered laminated film had an inner layer of a liquid crystal resin composition film with a thickness of 14 pm and an outer layer of a polyethylene film with a thickness of 9 pm. Physical properties of the laminated film are shown in Table 9.

Comparative Example 16

Extrusion from a cylindrical die was attempted in a manner similar to that in Example 17 except that the pellets of the liquid crystal polyester resin composition was replaced by the pellets of the liquid crystal polyester A-2 obtained in Comparative Example 17. The liquid crystal polyester for inner layer did not adequately form a film and a laminated film was not obtained.

TABLE 7

| | Composition (% by weight) | | | | Melt viscosity | | | | | |
|---|---|---|---|---|---|---|---|---|---|---|
| | | | | | Melt viscosity Measured at FT (poise) | | Melt viscosity Measured at FT + 20° C. (poise) | | Melt viscosity ratio | |
| | | | | | 100 | 1000 | 100 | 1000 | 100 | 1000 |
| | (A) | (B) | Others | Flow temp. (°C.) | sec$^{-1}$ | sec$^{-1}$ | sec$^{-1}$ | sec$^{-1}$ | sec$^{-1}$ | sec$^{-1}$ |
| Example 15 | A-1 72 | B-8 28 | 0 | 328 | 39000 | 7180 | 11400 | 2250 | 0.292 | 0.313 |
| Example 16 | A-1 83 | B-6 17 | 0 | 325 | 40700 | 7400 | 10300 | 2100 | 0.252 | 0.284 |
| Comparative Example 13 | A-1 100 | 0 | 0 | 320 | 48000 | 8200 | 3000 | 700 | 0.063 | 0.085 |
| Comparative Example 14 | A-1 72 | 0 | *1 28 | 249 | 25800 | 5900 | 7100 | 1300 | 0.275 | 0.220 |
| Example 17 | A-2 94 | B-9 6 | 0 | 264 | 42000 | 8400 | 9400 | 2400 | 0.224 | 0.286 |
| Example 18 | A-2 87 | B-9 13 | 0 | 265 | 40800 | 7300 | 12000 | 2900 | 0.294 | 0.397 |
| Comparative Example 15 | A-2 100 | 0 | 0 | 263 | 56000 | 9200 | 4900 | 1500 | 0.088 | 0.163 |
| Example 19 | A-2 68 | B-4 32 | 0 | 267 | 39500 | 6700 | 18500 | 3750 | 0.468 | 0.560 |
| Comparative Example 16 | A-2 100 | 0 | *1 30 | 263 | 56000 | 9200 | 4900 | 1500 | 0.088 | 0.163 |

*1: Low density polyethylene manufactured by Sumitomo Chemical Co., Ltd., trade name Sumikasen F-1103-1 (Stiffness modulus = 1300 kg/cm$^2$)

TABLE 8

| | Composition (% by weight) | | | Conditions for film-molding | | | | Physical properties of film | | | |
|---|---|---|---|---|---|---|---|---|---|---|---|
| | | | | Rate of | Draft | | Thickness | Tensile strength (kg/mm$^2$) | | Water vapor permeability (g/m$^2$ · 24 | Oxygen permeability (cc/m$^2$ · 24 |
| | Component (A) | Component (B) | Another component | winding up (m/min) | ratio in MD | Blow ratio | of film (μm) | MD | TD | hr · atm) | hr · atm) |
| Example 15 | A-1 72 | B-8 28 | 0 | 15 | 11.3 | 5.9 | 22 | 36 | 27 | 0.3 | 0.2 |
| Example 16 | A-1 83 | B-6 17 | 0 | 15 | 12.0 | 3.1 | 40 | 42 | 34 | 0.3 | 0.3 |
| Comparative Example 13 | A-1 100 | 0 | 0 | 15 | — | — | — | Film unobtainable | Film unobtainable | Film unobtainable | Film unobtainable |
| Comparative Example 14 | A-1 72 | 0 | 28*1 | 15 | — | — | — | Film unobtainable | Film unobtainable | Film unobtainable | Film unobtainable |
| Example 17 | A-2 94 | B-9 6 | 0 | 12 | 7.7 | 7.3 | 27 | 61 | 42 | 0.2 | 0.1 |
| Example 18 | A-2 87 | B-9 13 | 0 | 12 | 17.2 | 10.9 | 8 | 55 | 39 | 0.2 | 0.2 |
| Comparative Example 15 | A-2 100 | 0 | 0 | 12 | — | — | — | Film unobtainable | Film unobtainable | Film unobtainable | Film unobtainable |

*1: Low density polyethylene (manufactured by Sumitomo Chemical Co., Ltd., trade name Sumikasen F-1103-1, Stiffness modulus: 1,300 kg/cm$^2$)

TABLE 9

| | Constitution of Film | | Conditions for film-molding | | | | Physical properties of film | | | | |
|---|---|---|---|---|---|---|---|---|---|---|---|
| | Composition of inner layer (% by weight) | Composition of outer layer (% by weight) | Rate of winding up (m/min) | Draft ratio in MD | Blow ratio | Thickness of film (μm) | | Tensile strength (kg/mm²) | | Water vapor permeability (g/m² · 24 hr · atm) | Oxygen permeability (cc/m² · 24 hr · atm) | Morphology of inner layer |
| | | | | | | Composition of inner layer | Composition of outer layer | MD | TD | | | |
| Example 19 | A-2 68 | B-4 32 | 100*1 | 12 | 6.3 | 12.3 | 14 | 9 | 22 | 21 | 0.4 | 0.3 | A |
| Comparative Example 16 | A-2 100 | — | 100*1 | 12 | — | — | — | — | — | — | Film unobtainable | Film unobtainable | — |

*1: Low density polyethylene (manufactured by Sumitomo Chemical Co., Ltd., trade name Sumikasen F-1103-1, Stiffness modulus: 1,300 kg/cm²)

Examples 20

The liquid crystal polyester (A-1) and the epoxy group-containing ethylene copolymer (B-10) in a ratio of (A-1)/(B-10)=82/18 (by weight) were blended in a Henschel mixer. Each composition was melt-kneaded at a cylinder temperature of 348° C. with a twin-screw extruder TEX-30 manufactured by Nihon Seiko Co., Ltd. to give a liquid crystal polyester resin composition.

Using two single screw extruders having a diameter of 30 mm, the liquid crystal polyester resin composition was extruded with the first extruder at a cylinder temperature of 353° C. and a polypropylene, manufactured by Sumitomo Chemical Co., Ltd., trade name Noblen FS2011D, was extruded with the second extruder at a cylinder temperature of 270° C. Extruded resins were joined, introduced into a two layered coat-hanger die at a die temperature of 340° C. in the multimanifold system, extruded from a T-die having a die gap of 0.8 mm and a slit width of 300 mm and wound up at a rate of 11 m/min. A laminated film consisting of a liquid crystal resin composition film (thickness: 33 μm) and a polypropylene film (thickness: 35 μm) was obtained. Physical properties of the laminated film are shown in Table 10.

Comparative Example 17

Kneading and extrusion were attempted in a manner similar to that in Example 20 except that the epoxy group-containing ethylene copolymer (B-10) was replaced by a polyethylene, manufactured by Sumitomo Chemical Co., Ltd., trade name Sumikasen F-1103-1 (Stiffness modulus:1,300 kg/cm²). The liquid crystal polyester for inner layer did not adequately form a film and a laminated film was not obtained.

Comparative Example 18

Kneading and extrusion were attempted in a manner similar to that in Example 20 except that the epoxy group-containing ethylene copolymer (B-10) was not used. Remarkable peeling and non-uniform thickness were noted and a laminated film was not obtained.

Examples 21

The liquid crystal polyester (A-2) and the epoxy group-containing ethylene copolymer (B-9) in a ratio of (A-2)/(B-9)=68/32 (by weight) were blended in a Henschel mixer. Each composition was melt-kneaded at a cylinder temperature of 312° C. with a twin-screw extruder TEX-30 manufactured by Nihon Seiko Co., Ltd. to give a liquid crystal polyester resin composition.

Using two single screw extruders having a diameter of 30 mm, the liquid crystal polyester resin composition was extruded with the first extruder at a cylinder temperature of 313° C. and a polypropylene, manufactured by Sumitomo Chemical Co., Ltd., trade name Noblen FS2011D, was extruded with the second extruder at a cylinder temperature of 270° C. Extruded resins were joined, introduced into a two layered coat-hanger die at a die temperature of 310° C. in the multimanifold system, extruded from a T-die having a slit interval of 0.8 mm and a slit width of 300 mm and wound up at a rate of 22 m/min. A laminated film consisting of a liquid crystal resin composition film (thickness: 13 μm) and a polypropylene film (thickness: 37 μm) was obtained. Physical properties of the laminated film are shown in Table 10.

Example 22

Kneading and extrusion were effected in a manner similar to that in Example 20 except that the composition of the liquid crystal polyester resin composition was changed to (A-2)/(B-9)=91/9. A laminated film consisting of a liquid crystal resin composition film (thickness: 38 μm) and a polypropylene film (thickness: 29 μm) was obtained. Physical properties of the laminated film are shown in Table 10.

Example 23

Kneading and extrusion were effected in a manner similar to that in Example 21 except that the polypropylene, manufactured by Sumitomo Chemical Co., Ltd., trade name Noblen FS2011D was replaced by the low density polyethylene, manufactured by Sumitomo Chemical Co., Ltd., trade name Sumikasen F-1103-1. A laminated film consisting of a liquid crystal resin composition film (thickness: 19 μm) and a low density polyethylene film (thickness: 42 μm) was obtained. Physical properties of the laminated film are shown in Table 10.

Example 24

Kneading and extrusion were effected in a manner similar to that in Example 21 except that the polypropylene, manufactured by Sumitomo Chemical Co., Ltd., trade name Noblen FS2011D was replaced by the polycarbonate, manufactured by Sumitomo Dow Chemical Co., Ltd., trade name Calibre 300-6. A laminated film consisting of a liquid crystal resin composition film (thickness: 24 μm) and a polycarbonate film (thickness: 52 μm) was obtained. Physical properties of the laminated film are shown in Table 10.

Comparative Example 19

Kneading and extrusion were attempted in a manner similar to that in Example 21 except that the epoxy group-containing ethylene copolymer (B-9) was not used. Remarkable peeling and non-uniform thickness were noted and a laminated film was not obtained.

TABLE 10

| | Water vapor permeability (g/m² · 24 hr · atm) | Oxygen permeability (cc/m² · 24 hr · atm) | Adhesiveness |
|---|---|---|---|
| Example 20 | 0.4 | 0.3 | o |
| Comparative Example 17 | Not determined | Not determined | x |
| Comparative Example 18 | Not determined | Not determined | x |
| Example 21 | 0.5 | 0.4 | o |
| Example 22 | 0.3 | 0.3 | o |
| Example 23 | 0.5 | 0.5 | o |
| Example 24 | 0.4 | 0.5 | o |
| Comparative Exampel 19 | Not determined | Not determined | x |

TABLE 11

| | | Melt viscosity | | | | | |
|---|---|---|---|---|---|---|---|
| | Flow temp. (°C.) | Melt viscosity Measured at FT (poise) | | Melt viscosity Measured at FT + 20° C. (poise) | | Melt viscosity ratio | | Morpohology of the liquid crystal polyester resin composition |
| | | 100 sec$^{-1}$ | 1000 sec$^{-1}$ | 100 sec$^{-1}$ | 1000 sec$^{-1}$ | 100 sec$^{-1}$ | 1000 sec$^{-1}$ | |
| Example 20 | 325 | 40750 | 7500 | 10500 | 2300 | 0.258 | 0.307 | A |
| Comparative Example 17 | 265 | 29000 | 5100 | 13900 | 2800 | 0.479 | 0.549 | A |
| Comparative Example 18 | 320 | 48000 | 8200 | 3000 | 700 | 0.063 | 0.085 | — |
| Example 21 | 267 | 41000 | 6900 | 18700 | 3900 | 0.456 | 0.565 | A |
| Example 22 | 263 | 40700 | 7600 | 11500 | 2850 | 0.283 | 0.375 | A |
| Comparative Example 19 | 263 | 56000 | 9200 | 4900 | 1500 | 0.088 | 0.163 | — |

*1: Low density polyethylene manufactured by Sumitomo Chemical Co., Ltd., trade name Sumikasen F-1103-1 (Stiffness modulus = 1300 kg/cm²)

What is claimed is:

1. A laminated blown film In which a film made of a liquid crystal polyester resin composition and a film made of a thermoplastic resin are laminated;
wherein the liquid crystal polyester resin composition comprises (A) 56.0 through 99.0% by weight of a liquid crystal polyester and (B) 44.0 through 1.0% by weight of a thermoplastic resin, said liquid crystal polyester being a continuous phase and said thermoplastic resin being a disperse phase, and having a ratio (viscosity 1/viscosity 2) of 0.1 through 0.7 wherein said viscosity 1 is a melt viscosity measured at the flow temperature defined below with at least one shear rate selected from a shear rate 100 sec$^{-1}$ and a shear rate 1,000 sec$^{-1}$ and said viscosity 2 is a melt viscosity measured at a temperature higher than said flow temperature by 20° C. with the same shear rate as that in the melt viscosity at the flow temperature,
wherein the flow temperature is a temperature at which the melt viscosity of a resin is 48,000 poise when the resin heated at a temperature-raising rate of 4° C./minute is extruded from a nozzle of 1 mm in inside diameter and 10 mm in length under a load of 100 Kgf/cm²; and
wherein said thermoplastic resin is other than said liquid crystal polyester or said liquid crystal polyester resin composition.

2. A laminated film in which at least two layers in total of a film made of a liquid crystal polyester resin composition and a film made of a thermoplastic resin are laminated;
wherein the liquid crystal polyester resin composition comprises (A) 56.0 through 99.0% by weight of a liquid crystal polyester and (B) 44.0 through 1.0% by weight of a thermoplastic resin, said liquid crystal polyester being a continuous phase and said thermoplastic resin being a disperse phase, and having a ratio (viscosity 1/viscosity 2) of 0.1 through 0.7 wherein said viscosity 1 is a melt viscosity measured at the flow temperature defined below with at least one shear rate selected from a shear rate 100 sec$^{-1}$ and a shear rate 1,000 sec$^{-1}$ and said viscosity 2 is a melt viscosity measured at a temperature higher than said flow temperature by 20° C. with the same shear rate as that in the melt viscosity at the flow temperature,
wherein the flow temperature is a temperature at which the melt viscosity of a resin is 48,000 poise when the resin heated at a temperature-raising rate of 4° C./minute is extruded from a nozzle of 1 mm in inside diameter and 10 mm in length under a load of 100 Kgf/cm²; and
wherein said thermoplastic resin is other than said liquid crystal polyester or said liquid crystal polyester resin composition.

3. A laminated film in which at least two layers in total of a film made of a liquid crystal polyester resin composition comprising (A) 56 through 99% by weight of a liquid crystal polyester and (B) 44 through 1% by weight of a thermoplastic resin having an epoxy group and a film made of a thermoplastic resin other than a liquid crystal polyester and other than said liquid crystal polyester resin composition are laminated.

4. The laminated film according to claim 3, in which the thermoplastic resin (other than a liquid crystal polyester and than said liquid crystal polyester resin composition) is selected from the group consisting of polyolefins, polystyrene, polycarbonate, polyester, polybutylene terephthalate, polyacetal, polyamide, polyphenylene ether, polyether sulfone, ethylene-vinylacetate copolymer, polyvinylchloride, polyvinylidenechloride, fluororesin and polyphenylenesulfide.

5. The laminated film according to claim 3, which is produced by co-extruding the liquid crystal polyester resin composition and the thermoplastic resin other than said liquid crystal polyester resin composition using a co-extrusion die of two or more layers.

6. A liquid crystal polyester resin film made of a liquid crystal polyester resin composition comprising (A) 56.0 through 99.0% by weight of a liquid crystal polyester and (B) 44.0 through 1.0% by weight of a thermoplastic resin, said liquid crystal polyester being a continuous phase and said thermoplastic resin being a disperse phase, and having a ratio (viscosity 1/viscosity 2) of 0.1 through 0.7 wherein said viscosity 1 is a melt viscosity measured at the flow temperature defined below with at least one shear rate selected from a shear rate 100 $sec^{-1}$ and a shear rate 1,000 $sec^{-1}$ and said viscosity 2 is a melt viscosity measured at a temperature higher than said flow temperature by 20° C. with the same shear rate as that in the melt viscosity at the flow temperature, wherein the flow temperature is a temperature at which the melt viscosity of a resin is 48,000 poise when the resin heated at a temperature-raising rate of 4° C./minute is extruded from a nozzle of 1 mm in inside diameter and 10 mm in length under a load of 100 $Kgf/cm^2$; and wherein the thermoplastic resin (B) comprises 0.1 through 30% by weight of a glycidyl (unsaturated) carboxylate unit and/or an unsaturated glycidyl ether unit.

7. A liquid crystal polyester resin film made of a liquid crystal polyester resin composition comprising (A) 56.0 through 99.0% by weight of a liquid crystal polyester and (B) 44.0 through 1.0% by weight of a thermoplastic resin, said liquid crystal polyester being a continuous phase and said thermoplastic resin being a disperse phase, and having a ratio (viscosity 1/viscosity 2) of 0.1 through 0.7 wherein said viscosity 1 is a melt viscosity measured at the flow temperature defined below with at least one shear rate selected from a shear rate 100 $sec^{-1}$ and a shear rate 1,000 $sec^{-1}$ and said viscosity 2 is a melt viscosity measured at a temperature higher than said flow temperature by 20° C. with the same shear rate as that in the melt viscosity at the flow temperature, wherein the flow temperature is a temperature at which the melt viscosity of a resin is 48,000 poise when the resin heated at a temperature-raising rate of 4° C./minute is extruded from a nozzle of 1 mm in inside diameter and 10 mm in length under a load of 100 $Kgf/cm^2$; and wherein the thermoplastic resin (B) is an epoxy group-containing ethylene copolymer comprising (a) 50 through 99.9% by weight of an ethylene unit, (b) 0.1 through 30% by weight of a glycidyl (unsaturated) carboxylate unit and/or an unsaturated glycidyl ether unit and (c) 0 through 50% by weight of an ethylenically unsaturated ester compound unit.

* * * * *